United States Patent
Luna, Sr.

(10) Patent No.: US 6,714,129 B1
(45) Date of Patent: Mar. 30, 2004

(54) ANTENNA HOLDER

(76) Inventor: Raul Luna, Sr., 1516 E. O St., Wilmington, CA (US) 90744

( * ) Notice: Subject to any disclaimer, the term of this patent is extended or adjusted under 35 U.S.C. 154(b) by 256 days.

(21) Appl. No.: 10/008,496

(22) Filed: Nov. 13, 2001

(51) Int. Cl.[7] ............................. B60Q 1/34; B60Q 1/44
(52) U.S. Cl. .................... 340/475; 340/478; 340/479; 343/901; D14/139
(58) Field of Search .................... 340/463, 479, 340/431, 434, 902, 904; 343/894, 906, 708, 711, 712, 713, 715, 718, 721, 723

(56) References Cited

U.S. PATENT DOCUMENTS 3,696,334 A * 10/1972 Demeter ............... 340/432
4,039,894 A * 8/1977 Gardner, III ............ 315/76
5,448,456 A * 9/1995 Huynh .................. 362/540

* cited by examiner

Primary Examiner—Jeffery Hofsass
Assistant Examiner—Jennifer A Stone

(57) ABSTRACT

The invention comprises an antenna holder integrating a brake light and a turn signal light visible from the rear of the vehicle for vehicles. The antenna holder may include a telescopic bracket to ensure effective positioning of the antenna. Additionally, the antenna holder may be specifically adapted for aftermarket use on vehicles, such as recreational vehicles or light trucks.

4 Claims, 3 Drawing Sheets

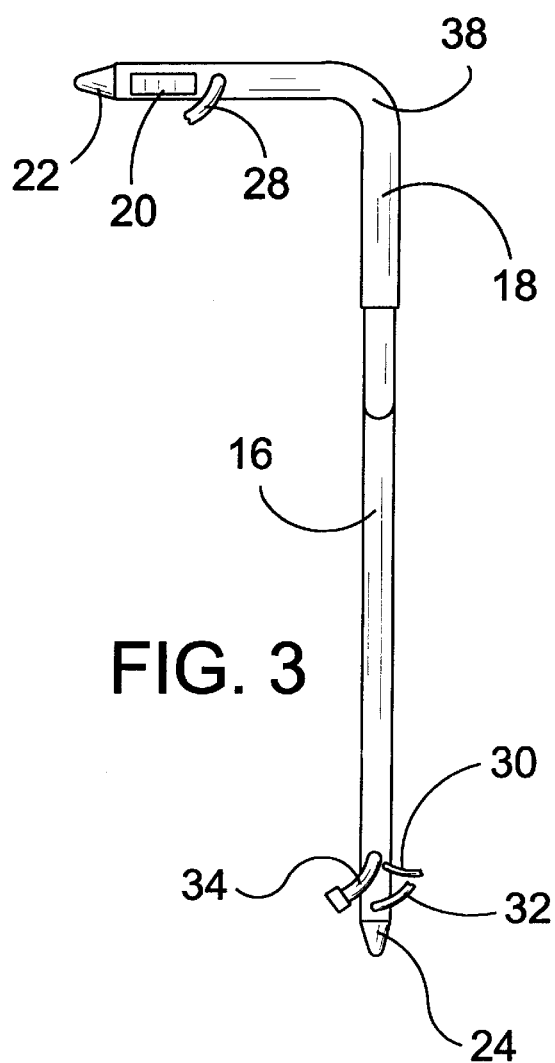
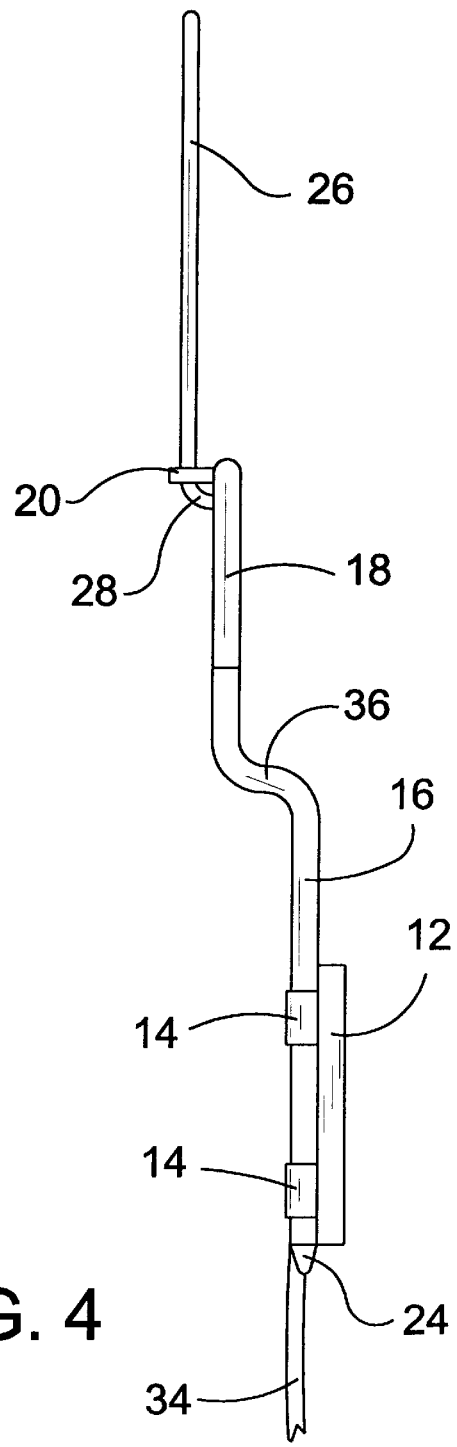

ANTENNA HOLDER

BACKGROUND OF THE INVENTION

1. Field of the Invention

The present invention relates to an antenna holder for use in connection with antennas mounted on vehicles. The antenna holder has particular utility in connection with a citizens band antenna mounted to a recreational vehicle in combination with brake lights and turn signal lights.

2. Description of the Prior Art

Antenna holders are desirable to assist in the addition of an antenna to a vehicle. After-market radios requiring antennas are often added to vehicles, and selecting an easy and effective place to mount the antenna is difficult. It is desirable to mount the antenna in a location that requires a minimal amount of vehicle modification and does not interfere with the views of the traffic available to the driver. Multiple antennas for citizen band and ham radios may be required and such antennas can distract from the driver view of traffic or may obscure some part of the visual field in available from the mirrors. The present invention allows the use of multiple antennas without obstructing the visual field of the driver and by the addition of lights to the antenna holder actually increases driver sensitivity to the location of the blind. The present invention also increases vehicle awareness to other vehicles especially from the rear of the vehicle by signaling both braking and turning.

The use of antenna holders is known in the prior art. U.S. Pat. No. 2,586,643 to Garlow discloses a radio antenna with a directional signal light for the front of a vehicle that gives an indication of direction from the front of the vehicle. However, the Garlow '643 patent does not have a brake light visible from the rear of the vehicle or a turn signal visible from the rear of the vehicle.

Similarly, U.S. Pat. No. 2,402,395 to Cohen discloses an antenna with a fender guide for indicating where objects are with respect to the front fenders. However, the Cohen '395 patent does not disclose either a turn signal light or a brake light and his device does not make the vehicle more visible from the back at night.

Lastly, U.S. Pat. No. 2,430,772 to Dalton discloses an extendible radio antenna with a locator light that gives an oncoming car visual feedback of vehicle location on the far side of obstructions or hills during approach. However, the Dalton '772 patent does not increase vehicle visibility from the rear, or signal braking or turns from the rear.

While the above-described devices fulfill their respective, particular objectives and requirements, the aforementioned patents do not describe an antenna holder that allows an antenna to be mounted in combination with brake lights and turn signal lights visible from the rear of the vehicle. The Garlow patent makes no provision for brake lights visible from the rear of the vehicle to determine the extent of the blind spot and his device did not make the vehicle more readily seen from the rear. The Cohen patent makes no provisions for signal turns, braking lights or make the vehicle more readily seen at night. The Dalton patent also does not increase vehicle visibility from the rear, or signal braking or turns visible from the rear of the vehicle.

Therefore, a need exists for a new and improved antenna holder that can be used for mounting antennas to vehicles in combination with brake lights visible from the rear and turn signal lights visible from the rear. In this regard, the present invention substantially fulfills this need. In this respect, the citizen band antenna holder according to the present invention substantially departs from the conventional concepts and designs of the prior art, and in doing so provides an apparatus primarily developed for the purpose of antenna holder in combination with brake lights and turn signal lights.

SUMMARY OF THE INVENTION

In view of the foregoing disadvantages inherent in the known types of antenna holders now present in the prior art, the present invention provides an antenna holder, and overcomes the above-mentioned disadvantages and drawbacks of the prior art. As such, the general purpose of the present invention, which will be described subsequently in greater detail, is to provide a new and improved citizen band antenna holder and method which has all the advantages of the prior art mentioned heretofore and many novel features that result in an antenna holder which is not anticipated, rendered obvious, suggested, or even implied by the prior art, either alone or in any combination thereof.

To attain this, the present invention essentially comprises an antenna holder attached to a brake light, a brake light electrical connection, having a brake signal receiving and a brake signal sending end, the brake signal receiving end being adapted for electrical connection to the vehicle electrical system and the brake signal sending end being connected to the brake light to enable the brake light to be responsive to the brake light electrical connection.

Also attached to the antenna holder is a turn signal light visible from the rear of the vehicle, a turn signal light electrical connection, having a turn signal receiving and a turn signal sending end, said turn signal receiving end being adapted for electrical connection to the vehicle electrical system and said turn signal sending end being connected to said turn signal light to enable said turn signal light to be responsive to said turn signal electrical connection.

There has thus been outlined, rather broadly, the more important features of the invention in order that the detailed description thereof that follows may be better understood and in order that the present contribution to the art may be better appreciated.

The invention may also include holders adapted to be mounted on each opposite side of said vehicle, red brake and stop lights, and lights being incandescent fuse lamps, vacuum fluorescent, micro-incandescent, light emitting diodes or light pipes, the pipes may be made out of steel, aluminum or fiber reinforced plastics, and may have entrances and exits for the wiring associated with the invention. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved citizen band antenna holder that has all of the advantages of the prior art antenna holders and none of the disadvantages.

It is another object of the present invention to provide a new and improved citizen band antenna holder that may be easily and efficiently manufactured and marketed.

It is further object of the present invention to provide a new and improved citizen band antenna holder that is of a durable and reliable construction.

An even farther object of the present invention is to provide a new and improved citizen band antenna holder which is susceptible of a low cost of manufacture with regard to both materials and labor, and which accordingly is then susceptible of low prices of sale to the consuming public, thereby making such citizen band antenna holder economically available to the buying public.

Still another object of the present invention is to provide a new citizen band antenna holder which provides in the apparatuses and methods of the prior art some of the advantages thereof, while simultaneously overcoming some of the disadvantages normally associated therewith.

Even still another object of the present invention is to provide a citizen band antenna holder for antenna holder in combination with brake lights and turn signal lights that provides a safe and stable means of mounting the antenna.

Another object of the present invention is to provide a citizen band antenna holder for antenna holder in combination with brake lights and turn signal lights that makes determining the location of the drivers blind spot much easier.

Yet another object of the present invention is to provide a citizen band antenna holder for antenna holder in combination with brake lights and turn signal lights that provides brake lights that are clearly visible to other motorists to the rear and rear sides of the vehicle.

Still even another object of the present invention is to provide a citizen band antenna holder for antenna holder in combination with brake lights and turn signal lights that increases night time visibility to other motorists.

Lastly, it is an object of the present invention to provide a new and improved citizen band antenna holder that signals both braking and turning and which is clearly visible from the rear and side of the vehicle.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a right side view of the antenna holder of the present invention.

FIG. 4 is a front side view of the antenna holder of the present invention

The same reference numerals refer to the same parts throughout the various figures.

DESCRIPTION OF THE PREFERRED EMBODIMENT

Figure 1:
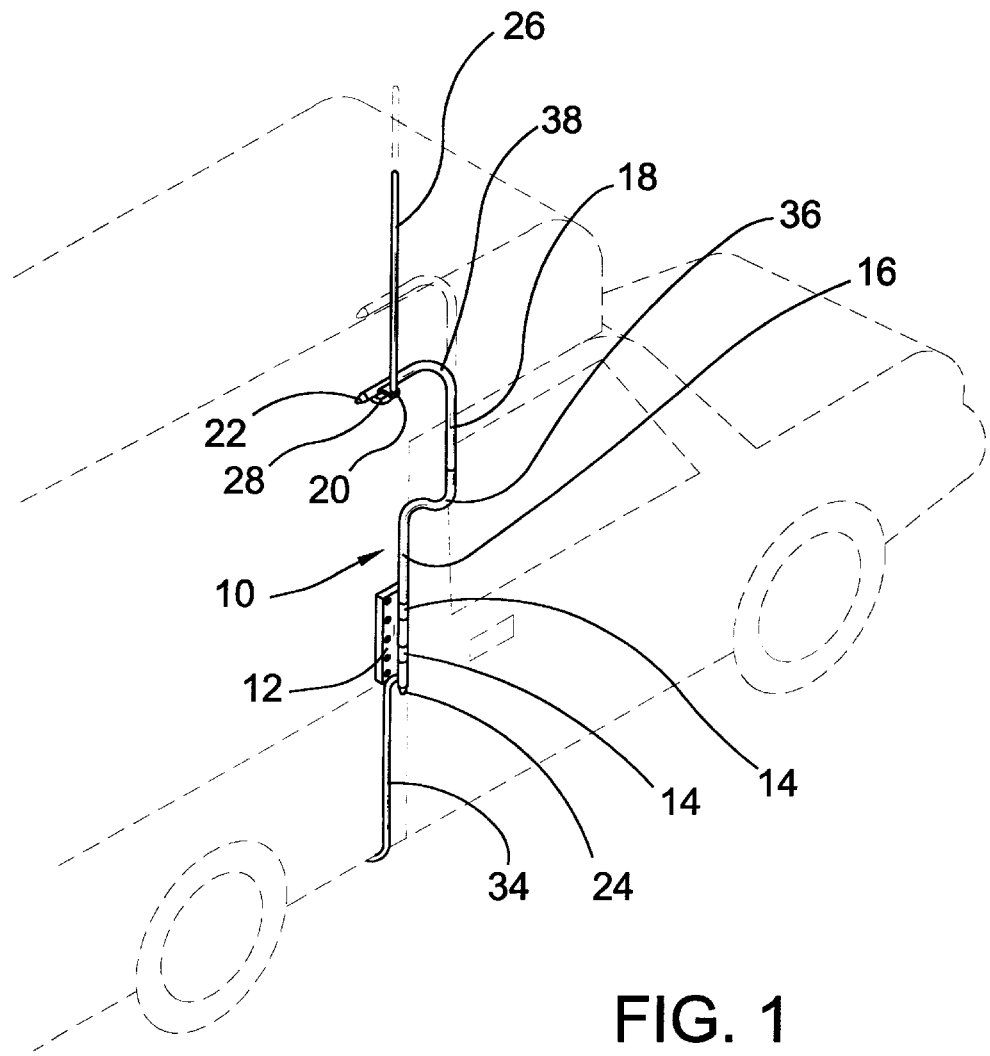
FIG. 1 is a right perspective view of the preferred embodiment of the antenna holder constructed in accordance with the principles of the present invention.

Referring now to the drawings, and particularly to FIGS. 1–4, a preferred embodiment of the antenna holder of the present invention is shown and generally designated by the reference numerals 10 and 40.

In FIG. 1, a new and improved antenna holder 10 of the present invention for vehicles is illustrated and will be described. The present embodiment of the antenna holder 10 is suited for use with a citizens band antenna, but may also be used in connection with antennas for other types of radios or other devices that require antennas. More particularly, the antenna holder 10 has a mounting bracket 12 having holes for mounting to the outer surface of the vehicle, attached to the mounting bracket 12 are a plurality of mounting clamps 14. Main pipe 16 is gripped around its circumference at its lower end by the mounting clamps 14. The main pipe 16 has a bend at its midsection 36 that allows it to be bent away from the vehicle by approximately three inches, the bends in the preferred embodiment being two complimentary ninety degree bends wherein the main pipe lower end and the main pipe upper end are parallel. Other complimentary bend angles can be used. At the lower end of the main pipe is a turn signal light 24 that can be detached. The turn signal light 24 having a turn signal light electrical connection, which has a turn signal receiving and a turn signal sending end, the turn signal receiving end being adapted for electrical connection to the vehicle electrical system and the turn signal sending end being connected to the turn signal light to enable the turn signal light to be responsive to the turn signal electrical connection. The upper end of the main pipe 16 is slidably connected to a telescopic pipe 18. The telescopic pipe 18 has a bend in its midsection 38 such that a telescopic pipe trailing section of approximately ten inches from the bend is formed. The telescopic pipe 18 having a hole near its trailing end for the exit of antenna coax cable 28. The telescopic pipe 18 having a brake light 22 connected to the telescopic pipe-trailing end. The brake light 22 having a brake light electrical connection, which has a brake signal receiving and a brake signal sending end, the brake signal receiving end being adapted for electrical connection to the vehicle electrical system and the brake signal sending end being connected to the brake light to enable the brake light to be responsive to the brake light electrical connection. The telescopic pipe 18 also having an antenna holder bracket 20 mounted adjacent to the trailing end of the telescopic pipe 18. A antenna 26 being bolted to the antenna holder bracket 20, the antenna 26 being electrically connected to the antenna coax cable 28 which exits the trailing end of the telescopic pipe 18. The antenna coax cable running through the telescopic pipe 18, the main pipe 16 and exiting 34 at the bottom of the main pipe 16.

Figure 2:
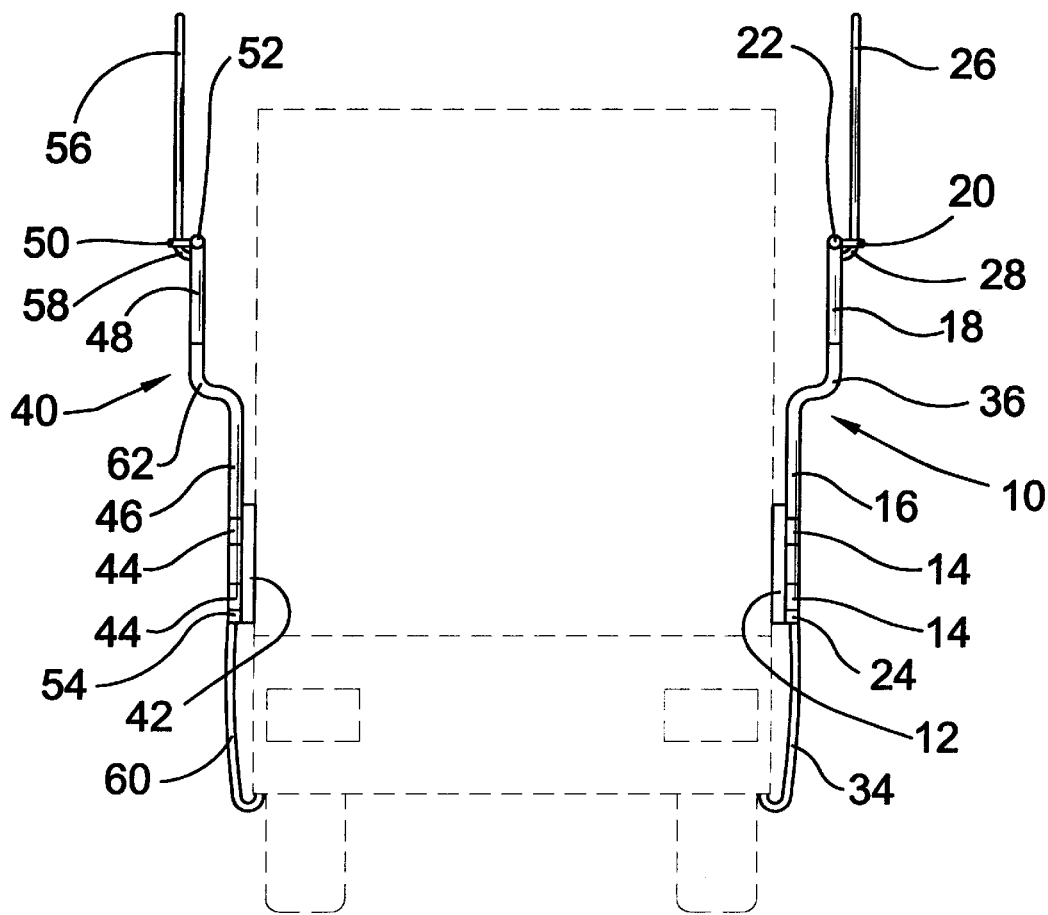
FIG. 2 is a rear side view of the antenna holder of the present invention.

In FIG. 2, the new and improved antenna holder 10 of the present invention for vehicles is illustrated and will be described. The antenna holder is shown in back orthogonal view being on both sides of the vehicle. The mounting bracket 12 being attached to the mounting clamps 14 which grip the lower end of the main pipe 16. The main pipe 16 having the turn signal light 24 mounted to its lower end. The main pipe 16 being bent at its midsection 36 so that it is offset from the vehicle. The telescopic pipe 18 is attached to the main pipe 16. The telescopic pipe 18 having the antenna coax cable exiting it 28. The telescopic pipe 18 also having the brake light 22 attached to it at the trailing end of the telescopic pipe 18. The telescopic pipe 18 has the antenna holder bracket 20 attached to it, and the antenna 26 bolted to the antenna holder bracket 20. The antenna coax cable 28 exiting the trailing end of the telescopic pipe 18, the antenna coax cable being routed through the telescopic pipe 18, communicating main pipe 16 and exiting 34 out the bottom of the main pipe 16. A version of the antenna holder for the second side of the vehicle is designated 40. A second mounting bracket 42 being attached to a second plurality of mounting clamps 44 which grip the lower end of a second main pipe 46. The second main pipe 46 having a second turn signal light 54 mounted to its lower end. The second main pipe 46 is bent at second main pipe midsection 62 so that it is offset from the vehicle. A second telescopic pipe 48 is attached to the second main pipe 46. The second telescopic pipe 48 having a second antenna coax cable exiting it 58. The second telescopic pipe 48 also having a second brake light 52 attached to it. The second telescopic pipe 48 also having a second antenna holder bracket 50 attached to it, and a second antenna 56 bolted to the second antenna holder 40. The second antenna coax cable 58 exits the second antenna holder bracket 40 at the trailing end of the second telescopic pipe 48. The second antenna coax cable being routed through the second telescopic pipe 48 and communicating second main pipe 46 and exiting 60 out the bottom of the second main pipe 46.

In FIG. 3, the new and improved antenna holder 10 of the present invention for vehicles is illustrated and will be described. FIG. 3 is shown in side orthogonal view and shows that at the bottom of the main pipe 16 there are three cables exiting the pipe, the antenna coax cable 34, a brake light cable 30 and a turn signal cable 32. The turn signal light 24 is shown at the bottom of the main pipe 16. The telescopic pipe 20 is shown connected to the main pipe 16. The midsection bend 38 of the telescopic pipe 18 is shown, as are the brake light 22 terminating at the trailing end of the telescopic pipe 18. The antenna holder bracket 20 is shown attached adjacent to the trailing edge of the telescopic pipe 18. The antenna coax cable 28 exits the telescopic pipe trailing end.

In FIG. 4, the new and improved antenna holder 10 of the present invention for vehicles is illustrated and will be described. The antenna holder is shown in front orthogonal view. The mounting bracket 12 being attached to the mounting clamps 14 that grip the lower end of the main pipe 16. The main pipe 16 having the turn signal light 24 mounted to its lower end. The main pipe 16 being bent at its midsection 36 so that it is offset from the vehicle. The telescopic pipe 18 is attached to the main pipe 16. The telescopic pipe 18 having the antenna coax cable exiting it 28. The telescopic pipe 18 also having an antenna holder bracket 20 attached to it, and the antenna 26 bolted to the antenna holder bracket 20. The antenna coax cable exiting the citizen band antenna holder 10 at the end of the telescopic pipe 28, the antenna coax cable being routed through the telescopic pipe and communicating main pipe and exiting 34 out the bottom of the main pipe 16.

The description of the direction of the figures would be from the frame of reference of the driver seated in the vehicle. The front view would be facing the same direction as the driver, the rear view would be behind the driver, the left side view would be on the left of the driver, and the right view would be to the right of the driver.

While a preferred embodiment of the antenna holder has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as aluminum, carbon-reinforced fiber or plastic may be used instead of the steel described. Also, the lights may be an incandescent fuse lamp, a vacuum fluorescent lamp, a micro-incandescent lamp, a light emitting diode and a light pipe. And although use on a motor vehicle has been described, it should be appreciated that the antenna holder herein described is also suitable for use on a boat or any moving craft. Furthermore, a wide variety of antennas may be used instead of the citizen band antenna described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An antenna holder for a vehicle comprising:

a mounting bracket for attachment to an outer surface of the vehicle;

a main pipe having an upper end, midsection and lower end said main pipe coupled to said mounting bracket, said main pipe having a plurality of holes adjacent to said main pipe lower end, said main pipe having a bend at said main pipe midsection wherein said main pipe lower end is offset from said main pipe upper end;

a turn signal light visible from the rear of the vehicle attached to said main pipe lower end;

a turn signal light electrical connection, having a turn signal receiving and a turn signal sending end, said turn signal receiving end being adapted for electrical connection to the vehicle electrical system and said turn signal sending end being connected to said turn signal light to enable said turn signal light to be responsive to said turn signal electrical connection;

a telescopic pipe having a slider coupling end and a trailing end which is substantially perpendicular to said slider coupling end, said telescopic pipe slider coupling end being attached to said main pipe upper end, said telescopic pipe having a hole adjacent to said telescopic pipe trailing end;

a brake light attached to said trailing end of said telescopic pipe;

a brake light electrical connection, having a brake signal receiving and a brake signal sending end, said brake signal receiving end being adapted for electrical connection to the vehicle electrical system and said brake signal sending end being connected to said brake light to enable said brake light to be responsive to said brake light electrical connection; and an antenna holder bracket mounted adjacent to said trailing end of said telescopic pipe for receiving an antenna.

2. The antenna holder for the vehicle of claim 1 wherein said antenna is a citizens band radio antenna.

3. The antenna holder for the vehicle of claim 1 wherein said vehicle is a recreational vehicle.

4. The antenna holder for the vehicle of claim 1 wherein:

said brake lights are red; and said turn signal lights are red.

\* \* \* \* \*